United States Patent

[11] 3,618,624

| [72] | Inventor | Juris Vairogs<br>Tulsa, Okla. |
|---|---|---|
| [21] | Appl. No. | 14,554 |
| [22] | Filed | Feb. 26, 1970 |
| [45] | Patented | Nov. 9, 1971 |
| [73] | Assignee | Cities Service Oil Company |

[54] FLUID PIPELINING
10 Claims, 2 Drawing Figs.

[52] U.S. Cl. ............................................ 137/13
[51] Int. Cl. ............................................ F17d 1/16
[50] Field of Search ............................................ 137/13; 252/8.3, 8.55, 15

[56] References Cited
UNITED STATES PATENTS
3,389,714  6/1968  Hughes.......................... 137/13
3,396,107  8/1968  Hill.............................. 252/8.55

Primary Examiner—Alan Cohan
Attorney—J. Richard Geaman

ABSTRACT: The present invention is a method for lowering the viscosity of a fluid being transferred in a pipeline by the introduction of a miscible gas, for example carbon dioxide, into the fluid that is being transported. The miscible gas-fluid mixture is then pumped at such conditions of temperature and pressure so as to prevent the formation of a gaseous phase by utilizing the unique two-phase liquid equilibrium characteristic of certain miscible gases in solution with hydrocarbons. The viscosity of the pipeline fluid is lowered while the deterrent effects of the gaseous phase are removed.

JURIS VAIROGS, INVENTOR.

JURIS VAIROGS,
INVENTOR.

FLUID PIPELINING

BACKGROUND OF THE INVENTION

The present invention relates to the operation and transportation of fluids within a pipeline. More particularly the invention relates to the pipelining of viscous crude oils. Crude petroleum is produced from oil fields and may vary in composition from almost gaslike materials of high API gravity to semisolid asphaltic materials having an extremely low gravity and a resulting low viscosity. The pipeline transportation of these crude oils is extremely difficult when the API gravity becomes lower than about 25° to 20°. Another necessary consideration is the pour point of the crude oil. When the pour point temperature of the crude oil will be experienced during the pipelining operation deposition of waxes will occur. Continued deposition upon the valves and the walls of the pipeline may inhibit the further transportation of crude oils through the pipeline network. Another pertinent consideration in the pipelining of viscous materials or crude oils with extremely high pour points is that over extremely long distances the application of heat or a solvent may be required to reduce the viscosity and lower the pour point of the crude oil to enable transportation.

One of the solutions to such problems is the design and construction of pipelines in a manner so as to minimize the heat loss from the fluid being pumped. By this procedure the viscosity of the crude oil being transported is maintained low enough such that the fluid will flow. Thus, in climates of extreme low temperature the pipeline will have to be heavily insulated and buried in deep trenches. Of course the construction costs involved and the labor, maintenance and construction pace present a tremendous deterrent to the pipelining of crude oils in these regions.

Other solutions which appear to be satisfactory are to have intermediate pumping stations with external heating sources applied at intervals along the pipeline. This practice would require extreme pipeline insulation to minimize heat losses and a large expenditure of energy and equipment to maintain the heated oil flowing within the pipeline. Another method for lowering crude oil viscosity is by the mixing of LPG or other suitable solvents with the crude oil. These solvents lower the crude oil viscosity effectively and render it mobile for pipeline transportation. In remote areas the availability of LPG and the expenditure of a relatively expensive solvent may not be desirable. Since the solvents are not always available in remote or sparsely populated areas and due to the expense and need for recovery of the solvent at the exit portion of the pipeline this method usually is not economical. What is desired is a method by which the viscous crude oil may be rendered less viscous and thereby more mobile for transportation within a pipeline. Also required is an economic and easily applied process for the viscosity reduction of the viscous crude oil and for returning the crude oil to its original state upon exit from the pipeline without additive contamination.

It is an object of this invention to provide an improved method for the transportation of crude oils within pipelines.

It is another object of the present invention to provide a method by which crude oil may be transported within pipelines under adverse viscosity conditions.

It is still another object of the present invention to utilize the unique phase behavior of certain miscible gases to overcome the phenomenon of crude oil viscosity and wax deposition during transportation of crude oils within pipelines.

With these and other objects in mind the present invention is hereinafter set forth with reference to the following description and drawings.

SUMMARY OF THE INVENTION

The objects of the present invention are accomplished by a method for transporting hydrocarbon material, which normally exhibits a viscosity that inhibits its flow in a pipeline, comprising the introduction of a miscible gas into the hydrocarbon material. The pipeline temperature and pressure conditions are maintained so as to prevent the formation of a gaseous phase within the pipeline. The method is particularly applicable when the hydrocarbon material is a crude oil having a viscosity above about 10 centipoise or a high pour point. Miscible gases which may be used in the present invention are selected from the group consisting of methane, ethane, carbon dioxide and mixtures of the aforementioned miscible gases. It is preferred to utilize the unique phase behavior of carbon dioxide as the miscible gas introduced into the pipeline. It is also preferred to inject the carbon dioxide at pressures up to the saturation point but less than about 2,000 p.s.i.a. such that two liquid phases are formed within the pipeline. In the two liquid phase region the pressures required to lower the viscosity of the crude oil are substantially reduced. Generally between 0.2 and 0.6 mole fraction carbon dioxide is required. The pressure upon the hydrocarbon material-miscible gas system is lowered at the exit of the pipeline to allow the miscible gas to escape from the hydrocarbon material. This pressure reduction affords a method by which the hydrocarbon material is readily returned to its original state and the carbon dioxide is recovered. By this method no contamination of the crude oil or hydrocarbon material transported occurs.

BRIEF DESCRIPTION OF THE DRAWINGS

The present invention is hereinafter described in further detail with particular reference to the accompanying drawings in which.

DETAILED DESCRIPTION OF THE INVENTION

It has been known in the art of pipeline transportation that the solution of light hydrocarbon gases such as methane and ethane in hydrocarbon liquids swells the volume of the resulting solution. In addition to a definite volume change there also is an apparent decrease in the viscosity and density of the resulting hydrocarbon miscible gas solution. The addition of carbon dioxide may be expected to yield similar results as that with methane and ethane. I have found, particularly with carbon dioxide and certain other miscible gases under specific conditions of temperature and pressure, that the resulting solution may be maintained so as to exhibit no gaseous phase. It has also been found that under specific conditions of miscible gas concentration two liquid phases may be formed with an absence of a gas phase. The phase behavior occurs with the addition of carbon dioxide into high molecular weight crude oils at appropriate temperature and pressure conditions. When the resultant solution is allowed to come to equilibrium, the mixture will separate into two phases. In effect there are two liquid phases, one hydrocarbon rich-liquid phase and one carbon dioxide rich-liquid phase, with the gas phase absent. This particular equilibrium only occurs with those miscible gases which exhibit the ability to contain the lighter components from the hydrocarbon mixture in a second liquid miscible gas-rich phase. With these gases there exists, under these particular conditions of temperature and pressure, a two-phase envelope of two liquid phases with no gaseous phase present. As the presence of a gaseous phase in a pipeline may cause vapor lock of pumps and bumping in the pipeline it is desirable to inhibit the formation of a free gas phase. One may maintain an equilibrium between the miscible gas and hydrocarbon material so as not to allow a gaseous phase or vapor phase to form within the pipeline where a vapor phase would be detrimental to the pipeline transportation of the hydrocarbon material.

The particular aspects of the present invention may be more easily understood by reference to the following examples:

EXAMPLE 1

Figure 1:
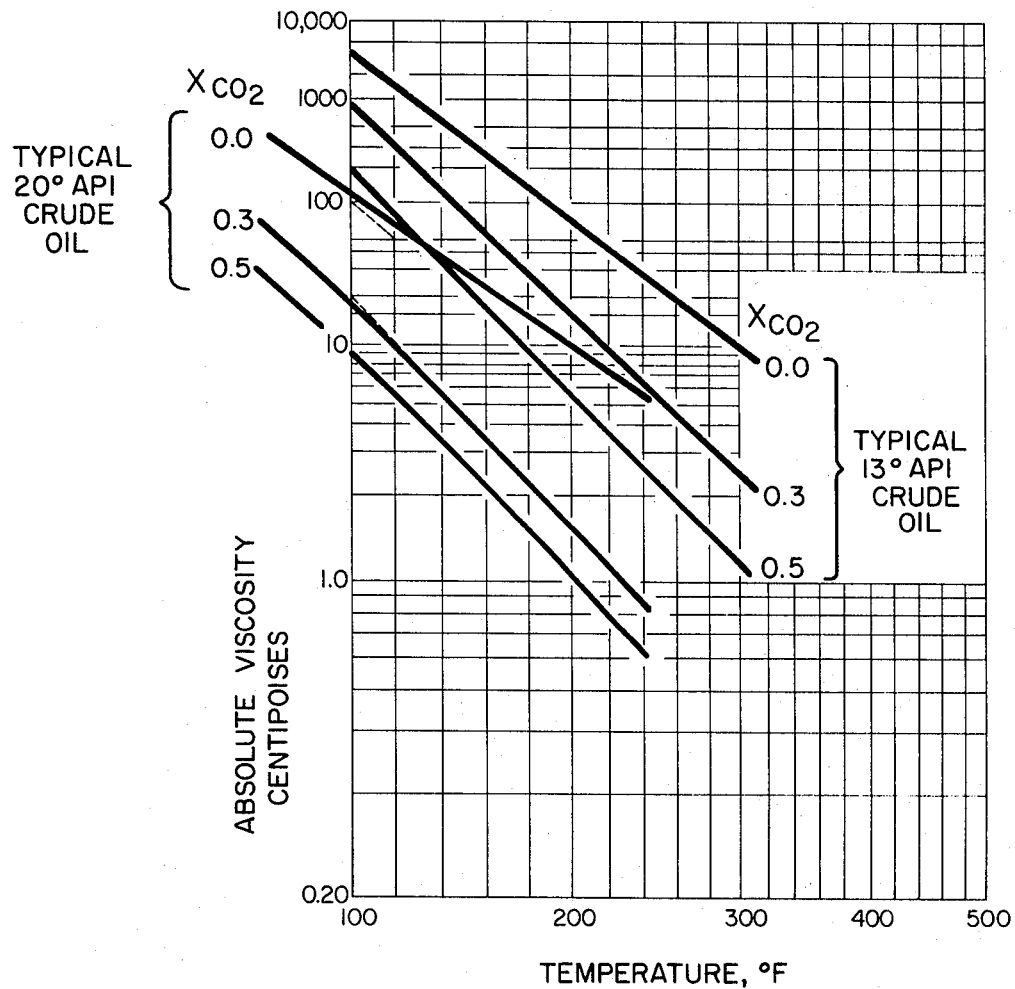
FIG. 1 depicts change in viscosity that may be obtained with temperature as a function of the carbon dioxide content of the crude oil.

Typical 13° API and 20° API crude oils were subjected to a temperature range from 110° to 250° F. and pressures up to 2,300 p.s.i.a. FIG. 1 represents the effect of the temperature and addition of carbon dioxide. The viscosity of the typical crude oils was drastically lowered at all temperatures by the addition of carbon dioxide. Carbon dioxide concentration was maintained from 0 to 50 percent by weight of the total weight of the crude oil—carbon dioxide mixture. Referral to FIG. 1 depicts that a 13° API crude oil is normally a semisolid at 300° F. and exhibits a viscosity of approximately 10 centipoise. The same crude oil with a 50 percent content by weight of carbon dioxide at the same temperature of 300° F. exhibits a viscosity of 1 centipoise. It may also be discerned from FIG. 1 that the 20° API crude oil at a 100° F. will exhibit a viscosity of approximately 100 centipoise and at 240° F. of approximately 5 centipoise. When a 50 percent mixture of carbon dioxide in the crude oil is formed a quite striking effect occurs as a 10 centipoise viscosity is exhibited at a 100° F. and a viscosity of approximately 0.6 centipoise is exhibited at 240° F. Therefore, it can be readily discerned from the viscosity phenomenon exhibited in FIG. 1 that upon the addition of a considerable amount of carbon dioxide, the viscosity of the oil may be radically lowered. The resulting viscosity for a crude oil saturated with carbon dioxide is generally one-tenth of the original viscosity.

Figure 2:
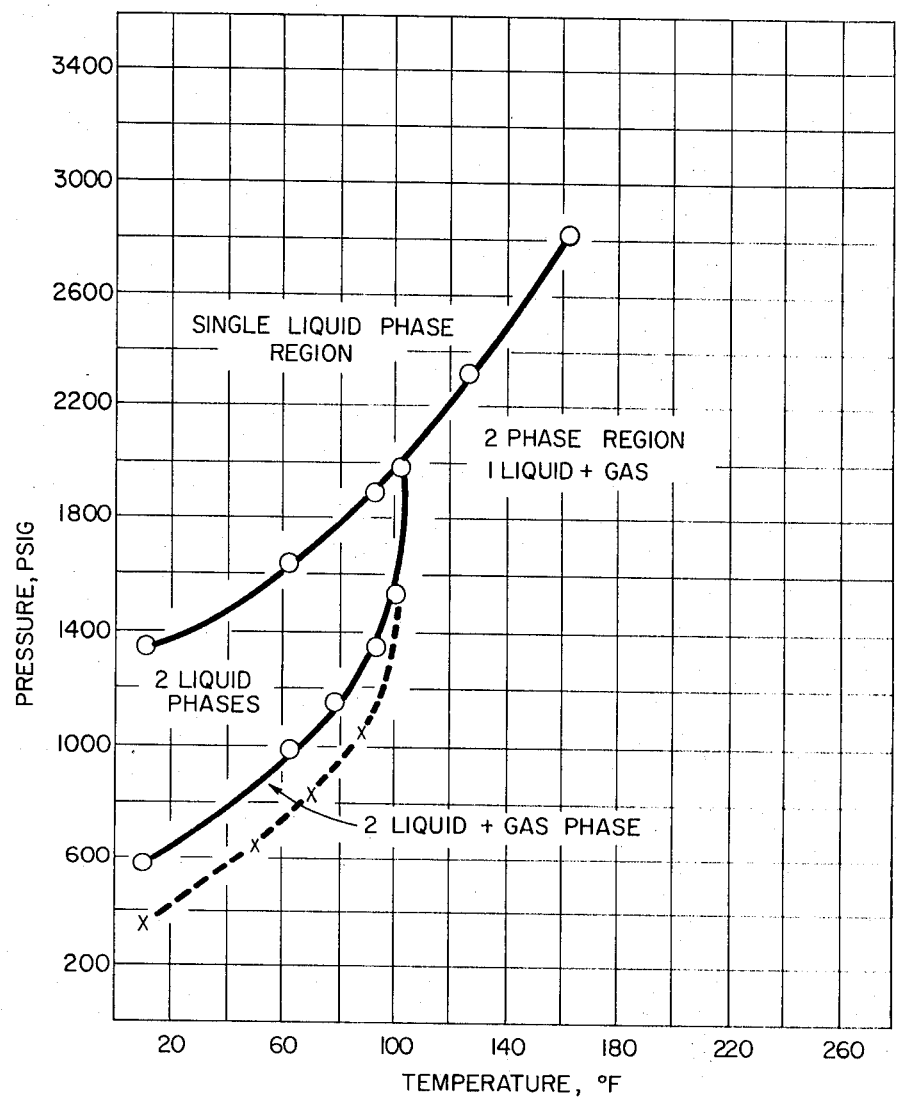
FIG. 2 represents a two-phase envelope in which the present invention may be used with a light crude oil for various conditions of temperatures and pressure.

Referring to FIG. 2, the phase behavior exhibited by a carbon dioxide - crude oil system is shown. FIG. 2 reveals a two-phase liquid envelope which occurs in the temperature range between 10° F. and 100° F. and the pressure range from 600 to 2000 p.s.i.g. Within this two-phase liquid envelope, which would be the operating conditions desired for pipeline transportation, no gaseous phase is exhibited. The lack of a gaseous phase and the viscosity lowering effect of the carbon dioxide gas upon the hydrocarbons transported, facilitates the hydrocarbon transportation, and provides an easily controlled means for lowering viscosity and preventing wax and paraffin fallout from hydrocarbons crude oils. To determine the conditions by which the crude oil should be transported within a pipeline a sample of the crude oil may be placed in the visual vapor-liquid equilibrium cell and carbon dioxide introduced over various temperature and pressure ranges to define the two liquid phase envelope. Where the pipeline is to be utilized under severe temperature extremes, such as the low temperatures of the North Slope of Alaska, one determines the range of temperatures to be experienced by the pipeline and introduces carbon dioxide over this temperature range for various pressures. By this method a reasonable pressure at which the pipeline may be maintained to transport the crude oil in a more mobile state may be determined,

EXAMPLE 2

To evaluate the use of a miscible gas, for example, carbon dioxide, for injection into a crude oil for pipeline transportation, the following equation and example are presented.

A crude oil having a 22° API gravity and viscosity of 110 centipoise at 50° F. is to be pipelined at a rate of 50,000 stock tank barrels per day over a 50 mile run of pipeline. The crude oil exhibits an average molecular weight of 358 and a swelling factor of 1,055. The pipeline pressure is to be maintained at 500 p.s.i.g. so that the crude oil will accept the carbon dioxide according to the following equation:

$$V_{CO_2} = \left[ SF - 1 \left( \frac{\frac{1}{\rho_L} - \frac{1}{\rho_H}}{\frac{1}{\rho_L}} \right) \right] V_o$$

where: $V_{CO_2}$ = volume of swelling attributed to dissolved carbon dioxide
$SF$ = swelling factor,
$\rho_L$ = density of oil at 14.7 p.s.i.a.
$\rho_H$ = density of oil at 500 p.s.i.a.
$v_o$ = volume of crude oil.

By the application of this formula the crude oil will dissolve 0.337 cubic feet of carbon dioxide per stock tank barrel of crude oil. For flow rate of 50,000 stock tank barrels per day the pipeline operation will require 16,850 cubic feet of carbon dioxide per day. The power savings due to the reduced viscosity from 110 centipoise to 18.7 centipoise in a 10 inch pipeline may be calculated by simple horsepower equations to be approximately 320 horsepower. A significant power reduction of 6.4 horsepower per 1,000 barrels of oil transported may be derived by the addition of the carbon dioxide gas. In addition the hydrocarbon—carbon dioxide mixture may be easily separated at the exit of the pipeline by the simple operation of flashing the solution to atmospheric pressure.

It has been found that most miscible gases under the proper conditions of pressure and temperature will exhibit a two-phase liquid region with appropriate hydrocarbon materials. Typical miscible gases may be selected from the group consisting of methane, ethane, carbon dioxide and mixtures of the aforementioned miscible gases. Carbon dioxide exhibits a favorable two-phase liquid envelope at pressures and at temperatures which are normally exhibited in pipeline operations. In particular pressures up to the saturation pressure of carbon dioxide in the hydrocarbon but less than 2,000 p.s.i.a. have proved satisfactory. I have found that reservoir crude oils having a viscosity in excess of 10 centipoise and which have had the solution gas released therefrom exhibit a two-phase liquid region at particularly low pressures, for example several hundred p.s.i.g. The two-phase liquid envelope is experienced for these crude oils in a temperature range from 40° F. to 200° F. In such a case the pressures are low enough to allow the use of carbon dioxide as a solvent at normal pipeline conditions. Depending upon the temperature, pressure and the entire composition of the crude oil, enough carbon dioxide may be added to form a single liquid phase. Generally, from 0.2 to 0.6 mole fraction carbon dioxide is required. However, it is a preferred embodiment of the present invention to inject a significant amount of carbon dioxide such that two miscible liquid phases are formed. Thus, while operating in the two-phase liquid envelope region the pressures used are normally half those encountered to operate in a single liquid phase region with no gas phase present. Under these operating conditions the pressure at the downstream end of the pipeline should always be higher than the initial saturation pressure of the hydrocarbon material at the inlet to insure continuous solution of carbon dioxide. By this procedure prevention of vapor phase formation is effected and no vapor lock will occur within the pipeline.

It is a preferred embodiment of the present invention to provide means for separating the miscible gas from the hydrocarbon material being transported. This may be accomplished by flashing the pipeline effluent as it exits. The flashing operation is from the pressure required for saturation of the hydrocarbon material with the miscible gas to a pressure at which the miscible gas will readily evolve from the effluent. A simple separator may be placed at the downstream end of the pipeline so that the miscible gas is emitted from the gas draw portion of the separator and pure hydrocarbon material, which was originally introduced into the pipeline, is produced from the bottom of the separator. No contamination of the hydrocarbon material occurs and the carbon dioxide may be transferred for commercial use or be expended to the atmosphere.

When utilizing carbon dioxide as the miscible gas in the present invention it may be necessary to include a corrosion inhibitor. The corrosion inhibitor will prevent the formation of carbolic acid by the interaction of the carbon dioxide with gas hydrates. It is preferred to include in the initial injection of the carbon dioxide into the hydrocarbon material transported a corrosion inhibitor. The inhibitor prevents breakdown of pipeline materials into solids which block the passage of the materials being transported. Although other permissible gases such as sulfur oxide, may be expected to give similar results as carbon dioxide, the particular problems of corrosion would normally prevent their use.

The present invention in its many embodiments provides a highly significant method for the transportation of hydrocarbon materials within pipelines. The process is applicable to both viscous crudes and hydrocarbon materials which may set up or have a high pour point and deposit paraffins or waxy substances within the interior of the pipeline and the pipeline mechanisms thereby disallowing further transport therethrough. The recovery of the hydrocarbon material at the downstream portion of the pipeline is enhanced by the physical dissolution of the miscible gas from the hydrocarbon-miscible gas mixture being transported. The necessity to heat materials within a pipeline, insulate the pipeline or add a solvent material which is not readily recovered and also easily contaminates the effluent from the pipeline is avoided. In addition an economic and simplified method is provided by which transported materials may be moved readily under severe initial viscosity conditions.

The invention has been described herein with respect to particular embodiments and aspects thereof. It will be appreciated by those skilled in the art that various changes and modifications may be made, however, without departing from the scope of the invention.

Therefore, I claim:

1. A method for transporting a hydrocarbon material which normally exhibits a viscosity sufficient to inhibit flow through a pipeline comprising:
   a. introducing a miscible fluid, which is gaseous under standard conditions of temperature and pressure into the hydrocarbon material; and
   b. maintaining the temperature and pressure conditions of the pipeline so as to prevent the formation of a gaseous phase within the pipeline.

2. The method of claim 1 in which the hydrocarbon material is a crude oil.

3. The method of claim 2 in which the miscible fluid is selected from the group consisting of methane, ethane, carbon dioxide and mixtures of the aforementioned miscible fluids.

4. The method of claim 2 in which the miscible fluid is carbon dioxide.

5. The method of claim 4, in which the crude oil has a viscosity greater than 10 centipoise.

6. The method of claim 5 in which the carbon dioxide is introduced such that two liquid phases are formed within the pipeline.

7. The method of claim 6 in which the pressure of the pipeline is maintained at less than about 2,000 p.s.i.a.

8. The method of claim 7 in which the concentration of carbon dioxide contained in the crude oil is between 0.2 to 0.6 mole fraction.

9. The method of claim 8 in which the temperature of pipeline is maintained in the range of 40° F. to 200° F.

10. The method of claim 1 further comprising lowering the pressure upon the hydrocarbons material-miscible fluid system at the exit of the pipeline to allow the miscible gas to escape from the hydrocarbon material.

* * * * *